US008965297B2

(12) United States Patent
Nojiri (10) Patent No.: US 8,965,297 B2
(45) Date of Patent: Feb. 24, 2015

(54) WIRELESS DEVICE AND COMMUNICATION METHOD

(75) Inventor: Seiwa Nojiri, Yokohama (JP)

(73) Assignee: JVC Kenwood Corporation, Yokohama-shi (JP)

( * ) Notice: Subject to any disclaimer, the term of this patent is extended or adjusted under 35 U.S.C. 154(b) by 216 days.

(21) Appl. No.: 13/586,707

(22) Filed: Aug. 15, 2012

(65) Prior Publication Data

US 2012/0309319 A1  Dec. 6, 2012

Related U.S. Application Data

(63) Continuation of application No. PCT/JP2011/005695, filed on Oct. 12, 2011.

(30) Foreign Application Priority Data

Nov. 16, 2010  (JP) ................................. 2010-256110

(51) Int. Cl.
*H04W 88/02* (2009.01)
*H04N 21/61* (2011.01)
(Continued)

(52) U.S. Cl.
CPC ......... *H04N 21/6131* (2013.01); *H04N 21/234* (2013.01); *H04N 21/2402* (2013.01); *H04N 21/64738* (2013.01); *G06F 3/14* (2013.01); *G09G 5/006* (2013.01);
(Continued)

(58) Field of Classification Search
CPC ... G08G 5/0031; H04B 13/02; H04N 2101/00
USPC ....................................................... 455/66.1
See application file for complete search history.

(56) References Cited

U.S. PATENT DOCUMENTS 7,221,901 B2 * 5/2007 Watanabe ..................... 455/3.05
7,256,821 B2 * 8/2007 Hata .......................... 348/211.3
(Continued)

FOREIGN PATENT DOCUMENTS

CN        101682745 A    3/2010
JP       2004-102067 A    4/2004
(Continued)

OTHER PUBLICATIONS

Extended European Search Report in European Patent Application No. 11841211.3, dated Oct. 11, 2013.
(Continued)

*Primary Examiner* — Hai V Nguyen
(74) *Attorney, Agent, or Firm* — Venable LLP; Michael A. Sartori; F. Brock Riggs (57) ABSTRACT

A wireless device, includes: a radio transmission path characteristic acquiring unit that acquires information related to a radio transmission path characteristic between a wireless device connected to a source device and a wireless device connected to a sink device; a revising unit that revises a table by deleting an unusable transmission parameter value from a table including a plurality of transmission parameter values usable by the sink device; a communication unit that executes wireless communication from the source device to the sink device in a range of a transmission parameter value represented by the table notified by the notifying unit; and a type information acquiring unit that acquires information related to a type of data which is a target of wireless communication in the communication unit.

4 Claims, 6 Drawing Sheets

(51) Int. Cl.

| | | |
|---|---|---|
| *H04N 21/234* | (2011.01) | |
| *H04N 21/24* | (2011.01) | |
| *H04N 21/647* | (2011.01) | |
| *G06F 3/14* | (2006.01) | |
| *G09G 5/00* | (2006.01) | |
| *H04N 21/4363* | (2011.01) | |
| *H04N 21/442* | (2011.01) | |
| *H04N 21/45* | (2011.01) | |
| *H04N 21/6377* | (2011.01) | |

(52) U.S. Cl.
CPC .. *H04N 21/43635* (2013.01); *H04N 21/43637* (2013.01); *H04N 21/44227* (2013.01); *H04N 21/4516* (2013.01); *H04N 21/6377* (2013.01); *G09G 2340/0407* (2013.01); *G09G 2350/00* (2013.01)
USPC ............... 455/66.1; 340/539; 348/207.1

(56) References Cited

U.S. PATENT DOCUMENTS

| | | | |
|---|---|---|---|
| 7,894,707 B2* | 2/2011 | Nakajima | 386/224 |
| 8,374,494 B2* | 2/2013 | Takahashi et al. | 386/326 |
| 2002/0191080 A1* | 12/2002 | Terada et al. | 348/207.1 |
| 2003/0128283 A1* | 7/2003 | Watanabe et al. | 348/231.9 |
| 2004/0150723 A1* | 8/2004 | Seo et al. | 348/207.1 |
| 2005/0146608 A1* | 7/2005 | Yosida et al. | 348/207.1 |
| 2005/0190270 A1* | 9/2005 | Park | 348/222.1 |
| 2006/0017751 A1* | 1/2006 | Shintani et al. | 345/698 |
| 2008/0141317 A1* | 6/2008 | Radloff et al. | 725/87 |
| 2009/0322948 A1 | 12/2009 | Funabiki et al. | |
| 2010/0066906 A1 | 3/2010 | Nakajima | |
| 2010/0073574 A1* | 3/2010 | Nakajima et al. | 348/723 |
| 2012/0086817 A1* | 4/2012 | Yamamoto | 348/207.1 |

FOREIGN PATENT DOCUMENTS

| | | |
|---|---|---|
| JP | 2008-076653 A | 4/2008 |
| JP | 2008-113198 A | 5/2008 |
| JP | 2009-213110 A | 9/2009 |
| WO | WO-2007/094347 A1 | 8/2007 |

OTHER PUBLICATIONS

Office Action in Chinese Patent Application No. 201180010097.9, dated Aug. 7, 2014.

\* cited by examiner

| THRESHOLD | RADIO TRANSMISSION THROUGHPUT |
|---|---|
| C1 | D1 |
| C2 | D2 |
| | |
| CL | DL |

| ID 210 | VALID PIXEL NUMBER 212 | POSSIBLE VIDEO TRANSMISSION THROUGHPUT 214 | NECESSARY DATA REDUCTION AMOUNT 216 | RADIO TRANSMISSION THROUGHPUT 218 |
|---|---|---|---|---|
| 1 | 1920 × 1080 p | 1485.0 Mbps | 1/14.85 | 100 Mbps |
| M | 720 × 576 p | 270 Mbps | 1/18 | 15 Mbps |

46

(b)

| ID 210 | VALID PIXEL NUMBER 212 | POSSIBLE VIDEO TRANSMISSION THROUGHPUT 214 | NECESSARY DATA REDUCTION AMOUNT 216 | RADIO TRANSMISSION THROUGHPUT 218 |
|---|---|---|---|---|
| 1 | 1920 × 1080 p | 1485.0 Mbps | 1/14.85 | 100 Mbps |
| N | 1920 × 1080 i | 742.5 Mbps | 1/74.25 | 10 Mbps |

WIRELESS DEVICE AND COMMUNICATION METHOD

CROSS-REFERENCE TO RELATED APPLICATION(S)

This application is a continuation of International Application No. PCT/JP2011/005695, filed on Oct. 12, 2011 which claims the benefit of priority of the prior Japanese Patent Application No. 2010-256110, filed on Nov. 16, 2010, the entire contents of which are incorporated herein by reference.

BACKGROUND OF THE INVENTION

1. Field of the Invention

The present invention relates to a communication technique, and more particularly, to a wireless device and a communication method that execute wireless communication replacing wired communication that conforms to a predetermined communication standard.

2. Description of the Related Art

An HDMI (High-Definition Multimedia Interface) (a registered trademark) is a standard related to interfaces mainly used for digital consumer electronics. The HDMI transfers a sound and a video in an uncompressed digital format, and so deterioration in an acoustic quality and an image quality can be suppressed. Further, the HDMI integrates a video, a sound, and a control signal and makes it possible to use a single cable, and so wiring is simplified. T.M.D.S. (Transition Minimized Differential Signaling) is employed in a physical layer of the HDMI, and HDCP (High-bandwidth Digital Content Protection) is employed for encryption.

Further, EDID (Extended display identification data) is employed for authentication between HDMI devices, and CEC (Consumer Electronics Control) is employed for a control system connection of the whole system. Particularly, the EDID is used to set a physical address or a physical parameter. An example of the physical parameter is a throughput. A network that conforms to the HDMI includes, for example, a source device that provides a video signal, a sink device that displays the video signal, and a cable that connects the source device with the sink device. In order to further simplify wiring of a network, it is desirable to use wireless communication rather than a cable. For example, wireless adaptors may be connected to the source device and the sink device, respectively, and wireless communication may be executed between the wireless adaptors (for example, see International Publication Pamphlet No. 07/094,347).

In the HDMI, throughput values are included in EDID as usable parameter values, and then the resultant EDID is notified from the sink device to the source device. The source device transmits a video signal using any one of throughput values included in the EDID. The throughput value is applied to a wireless section when a wireless adaptor is used. However, since a radio communication state of a wireless section changes over time, it may be impossible to achieve the throughput value. For this reason, it is required to stably transfer a video signal even under the circumstance where a radio communication state gets worse and so an effective throughput value of a wireless section is lowered.

SUMMARY OF THE INVENTION

It is an object of the present invention to at least partially solve the problems in the conventional technology.

In order to solve the above described problems, according to an aspect of the present invention a wireless device includes: a radio transmission path characteristic acquiring unit that acquires information related to a radio transmission path characteristic between a wireless device connected to a source device and a wireless device connected to a sink device; a revising unit that revises a table by deleting an unusable transmission parameter value from a table including a plurality of transmission parameter values usable by the sink device based on the information related to the radio transmission path characteristic acquired by the radio transmission path characteristic acquiring unit; a notifying unit that notifies the source device of the table revised by the revising unit; and a communication unit that executes wireless communication from the source device to the sink device in a range of a transmission parameter value represented by the table notified by the notifying unit.

According to this aspect, a table including a plurality of transmission parameter values usable by the sink device is revised based on the radio transmission path characteristic and notified to the source device. Thus, communication appropriate to a radio communication state can be implemented in wireless communication replacing wired communication that conforms to a predetermined communication standard.

According to another aspect of the present invention the wireless device further includes: a type information acquiring unit that acquires information related to a type of data which is a target of wireless communication in the communication unit, and the revising unit executes a revising process on a table including a transmission parameter value of a combination that differs according to a type of data according to the information related to the type of data acquired by the type information acquiring unit.

In this case, since the revising process is executed on the table including transmission parameter values of a combination that differs according to the type of data, the transmission parameter value corresponding to the information related to the type of data can be used.

Another aspect of the invention provides a communication method. The communication method includes: acquiring information related to a radio transmission path characteristic between a wireless device connected to a source device and a wireless device connected to a sink device; revising a table by deleting an unusable transmission parameter value from a table including a plurality of transmission parameter values usable by the sink device based on the information related to the acquired radio transmission path characteristic; notifying the source device of the revised table; and executing wireless communication from the source device to the sink device in a range of a transmission parameter value represented by the notified table.

Further, an arbitrary combination of the above components and conversion of an expression of the invention among a method, an apparatus, a system, a recording medium, and a computer program are also effective as an aspect of the invention.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

Before concretely describing the present invention, an outline will be first described. An embodiment of the invention relates to a communication system including a source device and a sink device that support the HDMI. In the present embodiment, a first wireless device is connected to the source device, a second wireless device is connected to the sink device, and wireless communication is executed between the first wireless device and the second wireless device. Even when the first wireless device and the second wireless device are added in the above-described way, in order to correspond to the HDMI, the resolution control by the EDID needs to be performed in the sink device.

In the wireless communication, generally a radio communication state changes. When the radio wave communication state gets worse, since the throughput of wireless communication is lowered, there is a need to increase a compression rate of a video compression codec. In addition, when the radio communication state remarkably gets worse, if the throughput of the wireless communication is extremely lowered and so a compression rate of a video compression codec becomes close to a limit, a blackout or freeze of a video is likely to occur. In order to suppress the occurrence of this situation, it is desirable to use the EDID appropriate to the radio communication state. Meanwhile, it is difficult for the sink device to grasp the radio communication state as long as it corresponds to the HDMI. In order to use the EDID appropriate to the radio communication state while corresponding to the HDMI, the first wireless device and the second wireless device according to the present embodiment execute the following process.

The second wireless device measures the radio communication state by receiving throughput confirmation data transmitted from the first wireless device. The second wireless device determines a usable throughput among a plurality of throughputs represented by the EDID transmitted from the sink device based on the radio communication state. Further, the second wireless device revises the EDID such that an unusable throughput is deleted from among a plurality of throughputs represented by the EDID. In addition, the second wireless device transmits the EDID to the source device via the first wireless device. The source device transmits a video signal to the sink device via the first wireless device and the second wireless device according to the EDID. In other words, by revising the EDID transmitted from the sink device according to the wireless communication state and then causing the source device to use the revised EDID, correspondence to the HDMI is maintained.

Figure 1:
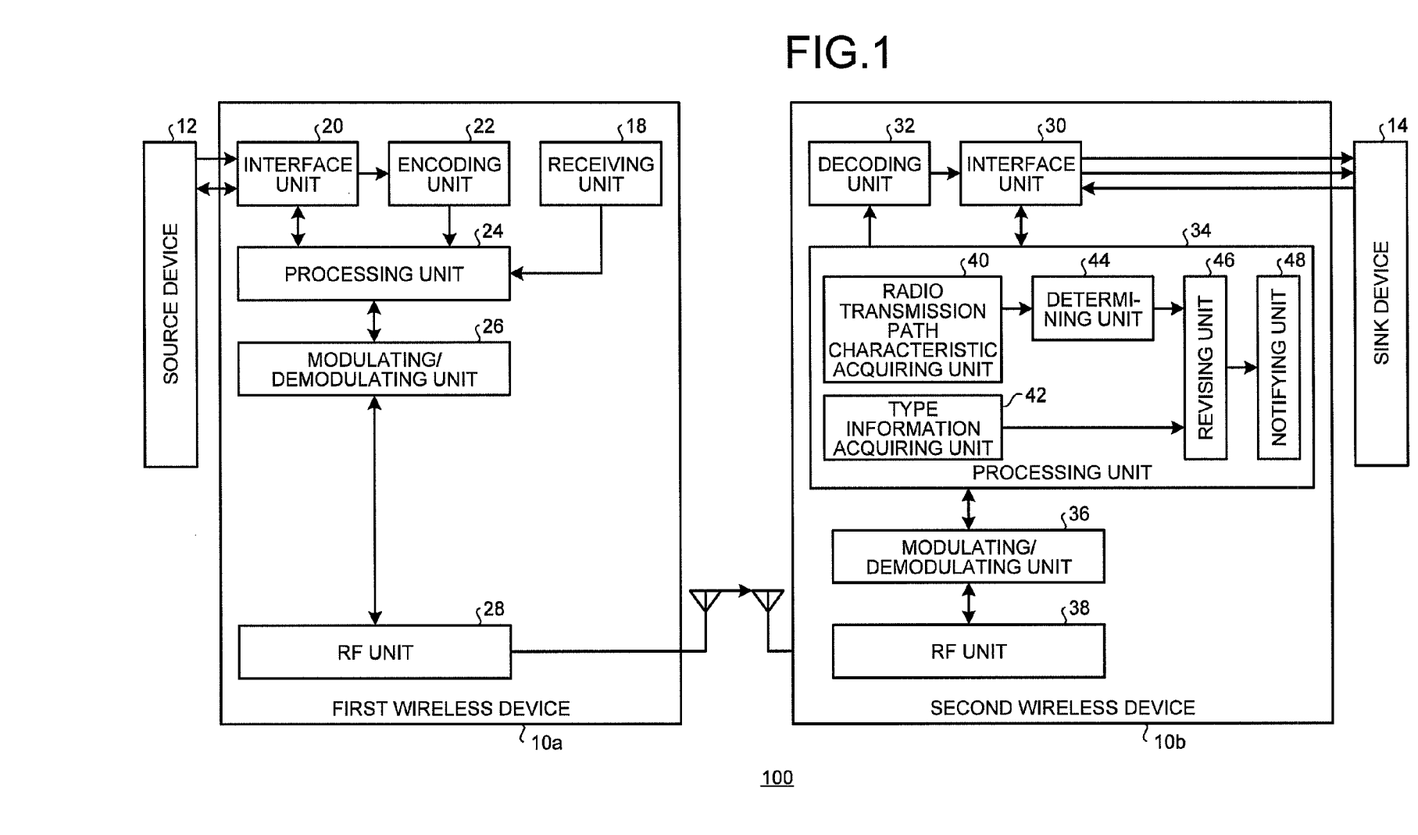
FIG. 1 is a diagram illustrating a configuration of a communication system according to an embodiment of the invention.

FIG. 1 illustrates a configuration of a communication system 100 according to an embodiment of the present invention. The communication system 100 includes: a first wireless device 10a and a second wireless device 10b which are collectively referred to as a "wireless device 10,"; a source device 12; and a sink device 14. The first wireless device 10a includes: a receiving unit 18; an interface unit 20; an encoding unit 22; a processing unit 24; a modulating/demodulating unit 26; and an RF unit 28. The second wireless device 10b includes: an interface unit 30; a decoding unit 32; a processing unit 34; a modulating/demodulating unit 36; and an RF unit 38. The processing unit 34 includes: a radio transmission path characteristic acquiring unit 40; a type information acquiring unit 42; a determining unit 44; a revising unit 46; and a notifying unit 48.

The source device 12 transmits a video signal while corresponding to the HDMI. Here, the video signal includes moving image data and sound data. Hereinafter, the video signal, the moving image data, the sound data are used without clear discrimination. The sink device 14 receives the video signal while corresponding to the HDMI, reproduces the video signal, and displays the reproduction result. To this end, the sink device 14 includes a monitor function. The first wireless device 10a is connected to the source device 12 by a cable that corresponds to the HDMI, and the second wireless device 10b is connected to the sink device 14 by a cable that corresponds to the HDMI.

Before a stage that the source device 12 receives the EDID, the processing unit 24 outputs throughput confirmation data for causing the second wireless device 10b to measure the radio communication state to the modulating/demodulating unit 26. The throughput confirmation data is a signal whose pattern is known to the second wireless device 10b and corresponds to a training signal. The processing unit 24 stores the throughput confirmation data in advance. The modulating/demodulating unit 26 receives the throughput confirmation data from the processing unit 24 and modulates the throughput confirmation data. The modulating/demodulating unit 26 outputs the modulated throughput confirmation data (which is also hereinafter referred to as "throughput confirmation data") to the RF unit 28. The RF unit 28 performs frequency transformation for transforming the throughput confirmation data received from the modulating/demodulating unit 26 into a radio frequency, amplifies the frequency transformation result, and transmits throughput confirmation data of the radio frequency (which is also hereinafter referred to as "throughput confirmation data") from an antenna.

The RF unit 38 receives the throughput confirmation data from the first wireless device 10a with an antenna. The RF unit 38 performs frequency transformation for transforming the received throughput confirmation data into an intermediate frequency (IF), and outputs throughput confirmation data of the intermediate frequency (which is also hereinafter referred to as "throughput confirmation data") to the modulating/demodulating unit 36. The modulating/demodulating unit 36 demodulates the throughput confirmation data received from the RF unit 38 and outputs the demodulated throughput confirmation data (which is also hereinafter referred to as "throughput confirmation data") to the processing unit 34.

The radio transmission path characteristic acquiring unit 40 of the processing unit 34 measures the radio communication state based on the throughput confirmation data. Specifically, the radio transmission path characteristic acquiring unit 40 measures an error rate on the throughput confirmation data. A BER (Bit Error Rate) or a PER (Packet Error Rate) may be used as the error rate, and a plurality pieces of throughput confirmation data may be transmitted from the first wireless device 10a for measurement of the error rate. In order to measure the error rate, the radio transmission path characteristic acquiring unit 40 compares the throughput confirmation data transmitted from the modulating/demodulating unit 36 with previously stored throughput confirmation data. The radio transmission path characteristic acquiring unit 40 outputs the measured error rate to the determining unit 44 as the radio communication state. The radio transmission path characteristic acquiring unit 40 may measure a CNR (Carrier to Noise Ratio) or electric field intensity and may regard the measured CNR or electric field intensity as the radio communication state. In other words, the radio transmission path characteristic acquiring unit 40 acquires a radio transmission path characteristic between the first wireless device 10a and the second wireless device 10b.

Figure 2:
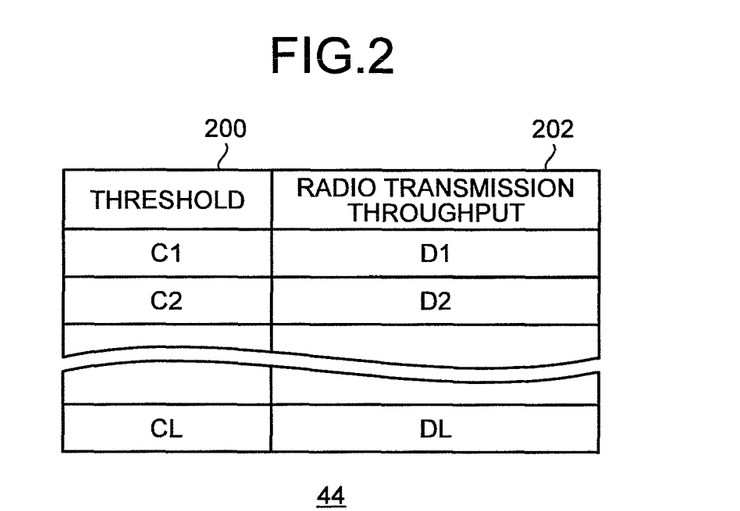
FIG. 2 is a diagram illustrating a data structure of a table stored in a determining unit of FIG. 1.

The determining unit 44 receives information related to the radio communication state from the radio transmission path characteristic acquiring unit 40. The determining unit 44 compares the information related to the radio communication state with a threshold and determines a radio transmission throughput usable between the first wireless device 10a and the second wireless device 10b. The determining unit 44 stores a plurality of thresholds in the form of a table. FIG. 2 illustrates a data structure of a table stored in the determining unit 44. As illustrated in FIG. 2, a threshold column 200 and a radio transmission throughput column 202 are included. In the threshold column 200, a plurality of thresholds such as C1 to CL is indicated. When the radio communication state is represented by the error rate, the threshold is specified as the error rate.

In the radio transmission throughput column 202, radio transmission throughputs each corresponding to the thresholds are indicated. In the communication system 100, a plurality of radio transmission throughputs are specified. Further, a plurality of usable radio transmission throughputs may be included in a single radio transmission throughput, for example, "D1." A threshold corresponding to a bad radio communication state is more likely to correspond only to a low-speed radio transmission throughput. Referring back to FIG. 1, when the radio communication state is represented by the error rate; the determining unit 44 compares each of a plurality of thresholds included in the threshold column 200 with the error rate; and specifies the smallest threshold among thresholds larger than the error rate. Further, the determining unit 44 specifies a radio transmission throughput corresponding to the specified threshold. The determining unit 44 outputs the specified radio transmission throughput to the revising unit 46.

A plurality types of mode is specified as a mode of a video signal which is to be transmitted from the source device 12. The receiving unit 18 receives information about a mode of a video signal to be used from a user. Here, a game mode and a high resolution mode are specified as the plurality types of video signal modes, and the receiving unit 18 receives information related to the game mode or the high resolution mode. For example, in the game mode, in order to minimize a video delay, an upper limit of a moving image compression rate may be lowered for the purpose of preferentially lowering the video delay rather than the resolution. As a result, a calculation time can be reduced. Meanwhile, in the high resolution mode, in order to prioritize the resolution, the upper limit of the moving image compression rate is increased to be higher than that of the game mode for the purpose of prioritizing a video of a high resolution to a maximum extent even though a video delay is ignored. The information about the mode of the video signal to be used is also referred to as information related to the type of data which is a target of wireless communication. The receiving unit 18 outputs the received information (hereinafter, referred to as "moving image mode selection information") about the mode of the video signal to the processing unit 24.

The processing unit 24 outputs the moving image mode selection information, similarly to the throughput confirmation data, to the modulating/demodulating unit 26. The modulating/demodulating unit 26 modulates the moving image mode selection information, similarly to the throughput confirmation data, and outputs the modulated moving image mode selection information (which is also hereinafter referred to as "moving image mode selection information") to the RF unit 28. The RF unit 28 transmits the moving image mode selection information of the radio frequency (which is also hereinafter referred to as "moving image mode selection information"), similarly to the throughput confirmation data, from the antenna.

The RF unit 38 receives the moving image mode selection information from the first wireless device 10a through the antenna, and outputs moving image mode selection information of an intermediate frequency (which is also hereinafter referred to as "moving image mode selection information"), similarly to the throughput confirmation data, to the modulating/demodulating unit 36. The modulating/demodulating unit 36 outputs demodulated moving image mode selection information (which is also hereinafter referred to as "moving image mode selection information"), similarly to the throughput confirmation data, to the processing unit 34. The type information acquiring unit 42 acquires the moving image mode selection information from the modulating/demodulating unit 36. The type information acquiring unit 42 outputs the moving image mode selection information to the revising unit 46.

The revising unit 46 receives the radio transmission throughput from the determining unit 44 and receives the moving image mode selection information from the type information acquiring unit 42. The revising unit 46 derives a moving image compression rate necessary to transmit a video signal and a possible video transmission throughput based on the radio transmission throughput. Here, this process will be concretely described. The possible video transmission throughput refers to a throughput of a video signal which can be transmitted from the source device 12 to the sink device 14. This can be said as a throughput of moving image data in an uncompressed state. Preferably, in the high resolution mode, the higher possible video transmission throughput is required than in the game mode.

The moving image compression rate refers to a compression rate for compressing a video signal to transmit a video signal of a possible video transmission throughput at a radio transmission throughput. The moving image compression rate is derived based on the possible video transmission throughput/radio transmission throughput. In the game mode, a lower moving image compression rate is desired than it is in the high resolution mode. When a plurality of radio transmission throughputs is input from the determining unit 44, the revising unit 46 derives the moving image compression rate and the possible video transmission throughput corresponding to each radio transmission throughput. When the moving image compression rate and the possible video transmission throughput are specified uniquely against the radio transmission throughput, this relation may be stored as a table. In this case, the revising unit 46 can specify the moving image compression rate and the possible video transmission throughput based on the radio transmission throughput without executing a calculation.

Thereafter, the revising unit 46 transmits an EDID request signal to the sink device 14 via the interface unit 30 in compliance with the HDMI standard. Then, the revising unit 46 receives the EDID from the sink device 14 via the interface unit 30. At least one throughput value usable by the sink device 14 is indicated in the EDID. The EDID is configured in the form of a table. Here, it is assumed that the throughput value is the possible video transmission throughput.

The revising unit 46 revises the EDID based on the moving image mode selection information. Since a low moving image compression rate is desirable in the game mode, when the moving image mode selection information is the game mode, the revising unit 46 deletes a possible video transmission throughput corresponding to a high moving image compression rate among a plurality of possible video transmission throughputs included in the EDID. However, since the resolution is prioritized in the high resolution mode, when the moving image mode selection information is the high resolution mode, the revising unit 46 deletes a possible video transmission throughput having a low resolution among a plurality of possible video transmission throughputs included in the EDID.

Through the above described processes, a game mode EDID or a high resolution mode EDID is generated based on an original EDID. Hereinafter, the game mode EDID and also the high resolution mode EDID are collectively referred to as "EDID." Subsequently to the above described process, the revising unit 46 compares the possible video transmission throughput included in the EDID with the possible video transmission throughput specified from the radio transmission throughput. The revising unit 46 revises the EDID by deleting the possible video transmission throughput, which is different from the latter, from the EDID.

In other words, the revising unit 46 revises the EDID by deleting an unusable possible video transmission throughput from the EDID based on the radio communication state. This corresponds to a case in which it is difficult for the sink device 14 to display the possible video transmission throughput included in the EDID since the radio communication state is bad. The revising process is performed, on the EDID specified for each type of data, according to the moving image mode selection information. However, when the possible video transmission throughput different from the latter is not included in the EDID, the revising unit 46 maintains the EDID as it is.

Figure 3:
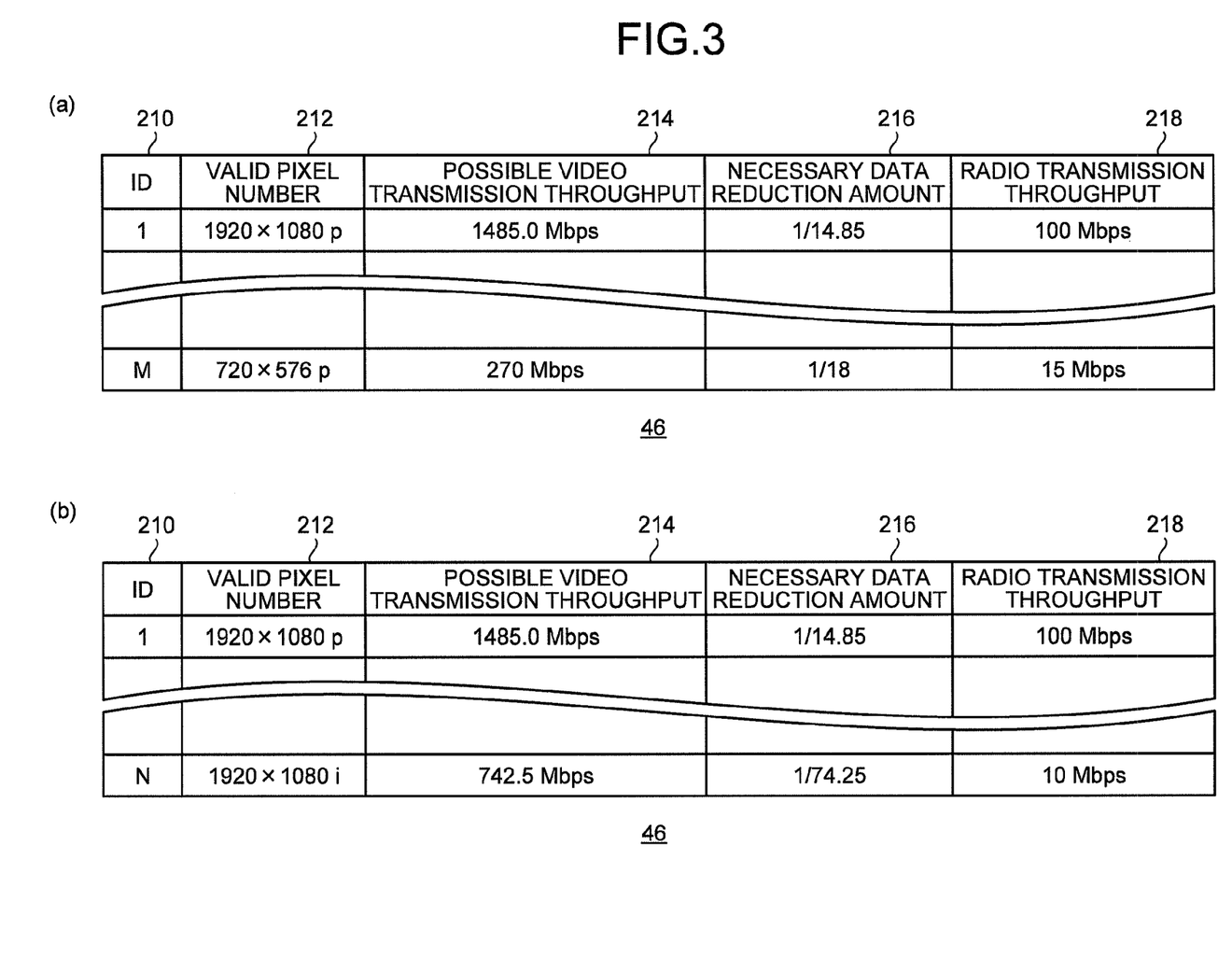
FIGS. 3(a) and 3(b) are diagrams illustrating data structures of EDIDs processed in a revising unit of FIG. 1.

FIGS. 3(a) and 3(b) illustrate data structures of EDIDs to be processed in the revising unit 46. FIG. 3(a) corresponds to the game mode EDID, and FIG. 3(b) corresponds to the high resolution mode EDID. FIGS. 3(a) and 3(b) correspond to results of revisions made based on the possible video transmission throughput specified from the radio transmission throughput. As illustrated in FIGS. 3(a) and 3(b), each of the game mode EDID and the high resolution mode EDID includes an ID column 210, a valid pixel number column 212, a possible video transmission throughput column 214, a necessary data reduction amount column 216, and a radio transmission throughput column 218. A number for identifying a plurality of possible video transmission throughputs included in the EDID is indicated in the ID column 210.

The number of valid pixels of a moving image is indicated in the valid pixel number column 212. In the necessary data reduction amount column 216, a compression rate is indicated. It can be said that the smaller a value of the compression rate is, the higher the compression rate is. As illustrated in FIGS. 3(a) and 3(b), since a low moving image compression rate is desirable in the game mode, a minimum value of the necessary data reduction amount column 216 in FIG. 3(a) is larger than a minimum value of the necessary data reduction amount column 216 in FIG. 3(b). Further, since the resolution is prioritized in the high resolution mode, a minimum value of the valid pixel number column 212 in FIG. 3(b) is larger than a minimum value of the valid pixel number column 212 in FIG. 3(a). Referring back to FIG. 1; the revising unit 46 outputs the EDID to the notifying unit 48.

The notifying unit 48 receives the EDID from the revising unit 46. The notifying unit 48 outputs the EDID to the modulating/demodulating unit 36 in order to notify the source device 12 of the EDID. Upon receiving the EDID from the notifying unit 48, the modulating/demodulating unit 36 modulates the EDID, and outputs the modulated EDID (which is also hereinafter referred to as "EDID") to the RF unit 38. The RF unit 38 performs frequency transform for transforming the EDID received from the modulating/demodulating unit 36 into a radio frequency, amplifies the frequency transform result, and transmits the EDID of the radio frequency (which is also hereinafter referred to as "EDID") from the antenna.

The RF unit 28 receives the EDID from the second wireless device 10b through the antenna. The RF unit 28 performs frequency transform for transforming the received EDID into the intermediate frequency, and outputs EDID of an intermediate frequency (which is also hereinafter referred to as "EDID") to the modulating/demodulating unit 26. The modulating/demodulating unit 26 demodulates the EDID received from the RF unit 28 and outputs the demodulated EDID (which is also hereinafter referred to as "EDID") to the processing unit 24. The processing unit 24 outputs the EDID to the source device 12 via the interface unit 20.

The source device 12 generates a video signal within a range of the possible video transmission throughput indicated in the EDID, and outputs the generated video signal to the interface unit 20. A known technique can be used for this process, and thus a description thereof will be omitted. The interface unit 20 outputs the video signal to the encoding unit 22. The encoding unit 22 encodes the video signal received from the interface unit 20, and outputs the encoded video signal (which is also hereinafter referred to as "video signal") to the modulating/demodulating unit 26 via the processing unit 24. The modulating/demodulating unit 26 and the RF unit 28 execute the same process as described above and transmit a video signal of a radio frequency (which is also hereinafter referred to as "video signal") from the antenna.

The RF unit 38 receives the video signal from the first wireless device 10a. The RF unit 38 and the modulating/demodulating unit 36 execute the same process as described above and output the demodulated video signal to the decoding unit 32 via the processing unit 34. The decoding unit 32 decodes the video signal, and outputs the decoded video signal (which is also hereinafter referred to as "video signal") to the interface unit 30. The interface unit 30 outputs the video signal received from the decoding unit 32 to the sink device 14. The sink device 14 displays a video on a monitor or the like. In other words, the RF unit 28, the RF unit 38, and the like execute wireless communication from the source device 12 to the sink device 14 within a range of the possible video transmission throughput represented by the EDID notified by the notifying unit 48.

Further, while the video signal is being transmitted from the source device 12 to the sink device 14, in accordance with changes of the radio communication state, the radio transmission throughput may change. In this case, the possible video transmission throughput also changes. As a result, the EDID needs to be revised again. The radio transmission path characteristic acquiring unit 40 and the determining unit 44 detect a change in the radio communication state based on the throughput confirmation data appropriately transmitted from the first wireless device 10a, and then output to that effect to the sink device 14 via the interface unit 30. The sink device 14 displays a message "please wait a second since video format information is being rewritten," and transmits the EDID to the second wireless device 10*b*. The second wireless device 10*b* revises the EDID again by repeating the above-described processes.

In terms of hardware, this configuration may be realized by a CPU (central processing unit), a memory, and other LSIs (large-scale integrations) of an arbitrary computer. In terms of software, this configuration may be realized by a program loaded in a memory, and the like. Here, functional blocks realized by a combination of hardware and software are illustrated. Thus, those skilled in the art would understand that the functional blocks can be realized in various forms such as hardware, software, or a combination thereof.

Figure 4:
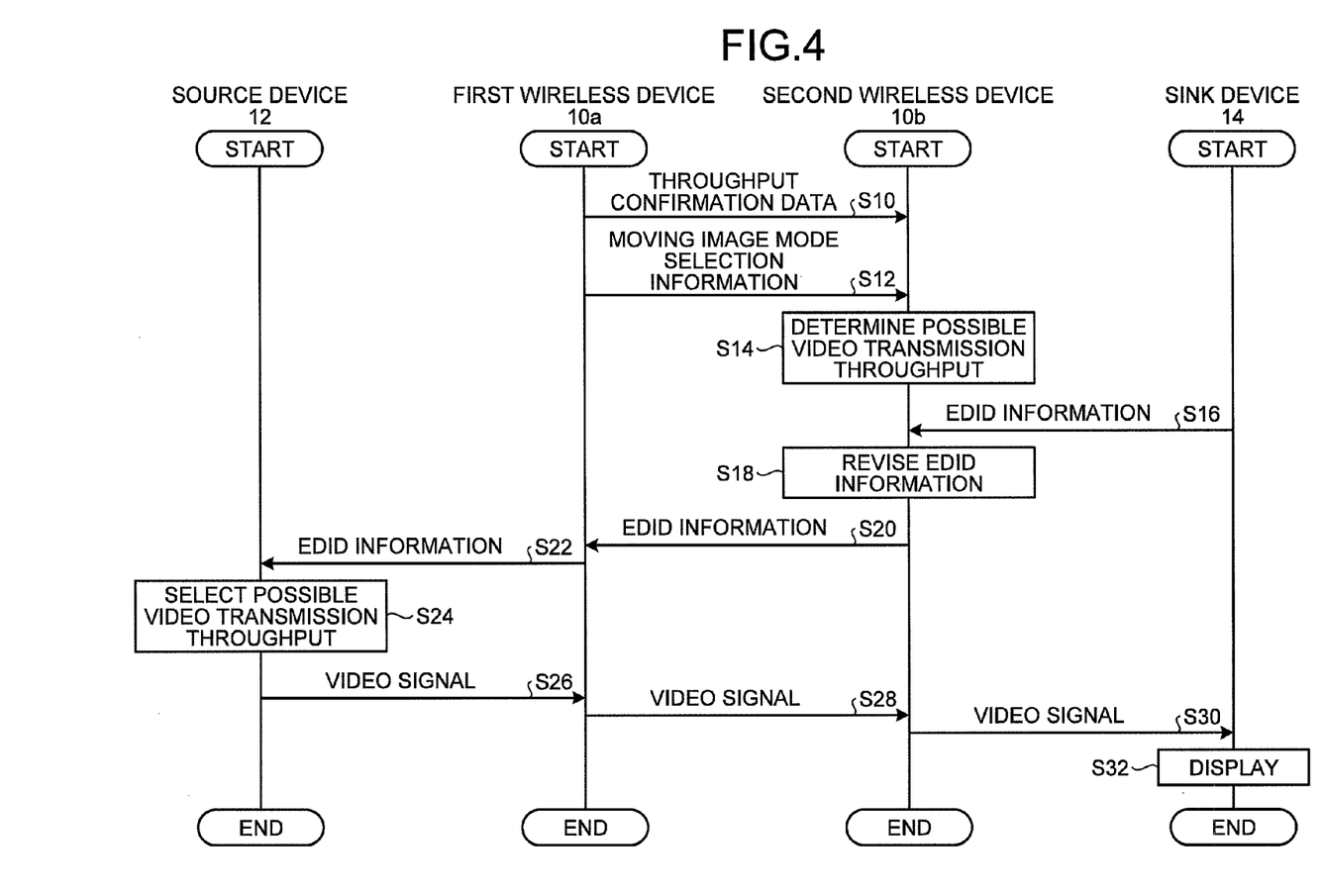
FIG. 4 is a sequence diagram illustrating a transmission procedure of moving image data by a communication system of FIG. 1.

An operation of the communication system 100 having the above-described configuration will be described. FIG. 4 is a sequence diagram illustrating a transmission procedure of the moving image data by the communication system 100. The first wireless device 10*a* transmits throughput confirmation data to the second wireless device 10*b* (S10). The first wireless device 10*a* transmits moving image mode selection information to the second wireless device 10*b* (S12). The second wireless device 10*b* determines a possible video transmission throughput (S14). The sink device 14 transmits EDID information to the second wireless device 10*b* (S16). The second wireless device 10*b* revises the EDID information (S18).

The second wireless device 10*b* transmits the EDID information to the first wireless device 10*a* (S20). The first wireless device 10*a* transmits the EDID information to the source device 12 (S22). The source device 12 selects a possible video transmission throughput (S24). The source device 12 transmits a video signal to the first wireless device 10*a* (S26). The first wireless device 10*a* transmits the video signal to the second wireless device 10*b* (S28). The second wireless device 10*b* transmits the video signal to the sink device 14 (S30). The sink device 14 displays a video (S32).

Figure 5:
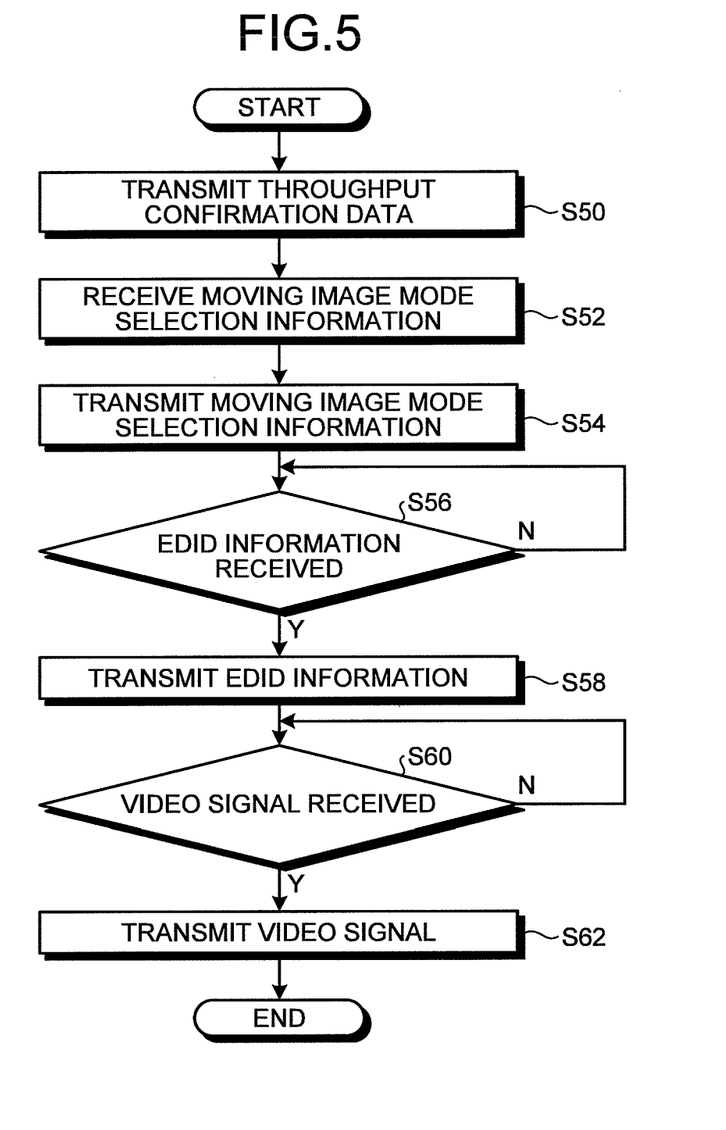
FIG. 5 is a flowchart illustrating a transmission procedure of moving image data by a first wireless device of FIG. 1.

FIG. 5 is a flowchart illustrating a transmission procedure of the moving image data by the first wireless device 10*a*. The processing unit 24 transmits throughput confirmation data via the modulating/demodulating unit 26 and the RF unit 28 (S50). The receiving unit 18 receives moving image mode selection information (S52). The processing unit 24 transmits the moving image mode selection information via the modulating/demodulating unit 26 and the RF unit 28 (S54). When EDID information has not been received via the RF unit 28 and the modulating/demodulating unit 26 (N in S56), the processing unit 24 is on standby.

However, when EDID information has been received via the RF unit 28 and the modulating/demodulating unit 26 (Y in S56), the processing unit 24 transmits the EDID information via the interface unit 20 (S58). When a video signal has not been received via the interface unit 20 and the encoding unit 22 (N in S60), the processing unit 24 is on standby. However, when a video signal has been received via the interface unit 20 and the encoding unit 22 (Y in S60), the processing unit 24 transmits the video signal via the modulating/demodulating unit 26 and the RF unit 28 (S62).

Figure 6:
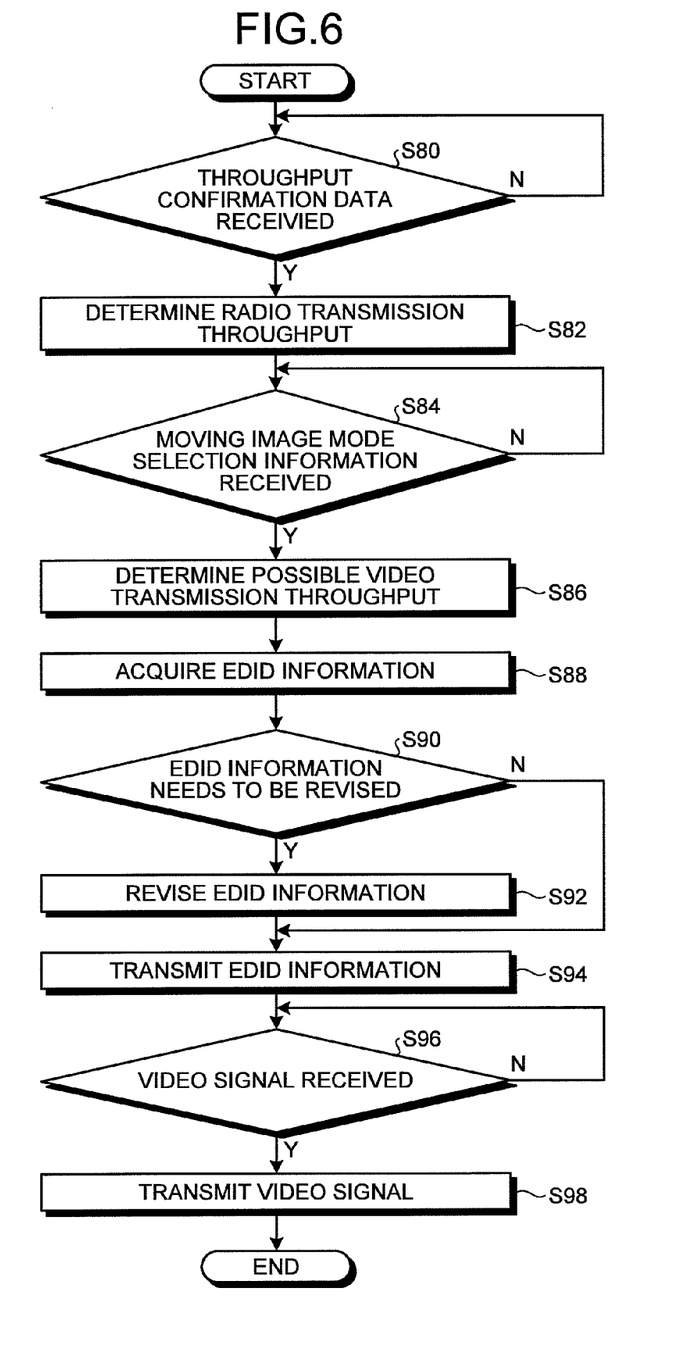
FIG. 6 is a flowchart illustrating a transmission procedure of moving image data by a second wireless device of FIG. 1.

FIG. 6 is a flowchart illustrating a transmission procedure of moving image data by the second wireless device 10*b*. When throughput confirmation data has not been received via the RF unit 38 and the modulating/demodulating unit 36 (N in S80), the radio transmission path characteristic acquiring unit 40 is on standby. When the radio transmission path characteristic acquiring unit 40 has received throughput confirmation data via the RF unit 38 and the modulating/demodulating unit 36 (Y in S80), the determining unit 44 determines a radio transmission throughput (S82). When moving image mode selection information has not been received via the RF unit 38 and the modulating/demodulating unit 36 (N in S84), the type information acquiring unit 42 is on standby. However, when the type information acquiring unit 42 has received moving image mode selection information via the RF unit 38 and the modulating/demodulating unit 36 (Y in S84), the revising unit 46 determines a possible video transmission throughput (S86).

The revising unit 46 acquires EDID information via the interface unit 30 (S88). When the EDID information needs to be revised (Y in S90), the revising unit 46 revises the EDID information (S92). However, when the EDID information does not need to be revised (N in S90), step S92 is skipped. The notifying unit 48 transmits the EDID information via the modulating/demodulating unit 36 and the RF unit 38 (S94). When the video signal has not been received via the RF unit 38 and the modulating/demodulating unit 36 (N in S96), the processing unit 34 is on standby. However, when the processing unit 34 has received the video signal via the RF unit 38 and the modulating/demodulating unit 36 (Y in S96), the decoding unit 32 transmits the video signal via the interface unit 30 (S98).

According to an exemplary embodiment of the present invention, the sink device revises the EDID indicating a plurality of usable possible video transmission throughputs based on the radio communication state and notifies the source device of the revised EDID. Thus, communication that is appropriate to a radio communication state can be executed in wireless communication replacing wired communication that conforms to the HDMI. Further, since the revising process is executed on the EDID including a possible video transmission throughput of a combination that differs according to the type of data, the possible video transmission throughput corresponding to the moving image mode selection information may be used. Further, since the throughput confirmation data is timely monitored, even though the radio communication state gets worse, the frequency of occurrence of a situation that an image is not displayed can be reduced. Further, since the frequency of occurrence of the situation that an image is not displayed is reduced, wireless transmission of an image and a sound can be stably executed. In addition, even though the radio communication state has gotten worse, since a modulation method remains fixed, influence such as deterioration in a reception performance or a reduction in a communication distance due to change of the modulation method can be avoided.

Further, since a revision of the EDID according to the radio communication state is executed by merely inserting the wireless device between the source device and the sink device that conform to the HDMI standard, wireless communication that conforms to the HDMI standard can be easily executed. Further, since the revised EDID is notified to the source device, the source device can select the stable EDID. Further, since the source device selects the stable EDID, the occurrence of a video breakdown or the like in the sink device can be suppressed. Further, the source device and the sink device which include the HDMI interface can realize wireless communication by introducing the wireless device without any change or modification. In the communication system, since the game mode or the high resolution mode is selected on the moving image compression rate, a low delay video or a high resolution video can be acquired according to demands of the user.

Hereinbefore, the present invention has been described based on the embodiment. The above embodiment is exemplary, and the components or the processing processes of the above embodiment can be modified in various forms. Those skilled in the art would understand that modified embodiments also are included in the scope of the present invention.

In the exemplary embodiment of the present invention, the second wireless device 10b revises the EDID. However, the invention is not limited to this embodiment. For example, the first wireless device 10a may revise the EDID. In this case, the type information acquiring unit 42, the determining unit 44, the revising unit 46, and the notifying unit 48 are included in the first wireless device 10a. Upon acquiring the radio communication state, the radio transmission path characteristic acquiring unit 40 of the second wireless device 10b transmits the radio communication state to the first wireless device 10a. Further, the radio transmission path characteristic acquiring unit 40 may be also included in the first wireless device 10a. In this case, the process is executed under the assumption that the radio communication state from the second wireless device 10b to the first wireless device 10a is equal to the radio communication state from the first wireless device 10a to the second wireless device 10b. According to the present modified embodiment, the configuration of the second wireless device 10b can be simplified.

In the exemplary embodiment of the present invention, the communication system 100 specifies two modes including the game mode and the high resolution mode. However, the present invention is not limited to this embodiment, and three or more modes may be specified. According to the present modified embodiment, the possible video transmission throughput can be set in detail.

In the exemplary embodiment of the present invention, the first wireless device 10a is different in the configuration from the second wireless device 10b. However, the present invention is not limited to this embodiment. For example, the wireless device 10 may be configured to include both the configuration of the first wireless device 10a and the configuration of the second wireless device 10b. In this case, the wireless device 10 includes a switch for selecting execution of an operation corresponding to the first wireless device 10a or execution of an operation corresponding to the second wireless device 10b. According to the present modified embodiment, the HDMI can be provided with a wireless function by the wireless device 10 of a single type.

REFERENCE SIGNS LIST 10 wireless device, 12 source device, 14 sink device, 18 receiving unit, 20 interface unit, 22 encoding unit, 24 processing unit, 26 modulating/demodulating unit, 28 RF unit, 30 interface unit, 32 decoding unit, 34 processing unit, 36 modulating/demodulating unit, 38 RF unit, 40 radio transmission path characteristic acquiring unit, 42 type information acquiring unit, 44 determining unit, 46 revising unit, 48 notifying unit, 100 communication system.

According to the present invention, communication appropriate to a radio communication state can be implemented in wireless communication replacing wired communication that conforms to a predetermined communication standard.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A wireless device, comprising:
a radio transmission path characteristic acquiring unit that acquires information related to a radio transmission path characteristic between a first wireless device connected to a source device and a second wireless device connected to a sink device;
a type information acquiring unit that acquires information related to a mode of data which is a target of wireless communication from the first wireless device to the second wireless device;
a revising unit that revises a table by deleting an unusable transmission parameter value from the table including a plurality of transmission parameter values usable by the sink device on the basis of the information related to the radio transmission path characteristic, the information related to the mode of data, and information related to a moving image compression rate that is needed when the wireless communication is performed;
a notifying unit that notifies the source device of the table revised by the revising unit; and
a communication unit that executes wireless communication from the source device to the sink device in a range of a transmission parameter value represented by the table notified by the notifying unit;
wherein the revising unit derives the information related to the moving image compression rate on the basis of the information related to the radio transmission path characteristic.

2. A communication method, comprising:
acquiring information related to a radio transmission path characteristic between a first wireless device connected to a source device and a second wireless device connected to a sink device;
acquiring information related to a mode of data which is a target of wireless communication from the first wireless device to the second wireless device;
revising a table by deleting an unusable transmission parameter value from the table including a plurality of transmission parameter values usable by the sink device on the basis of the information related to the acquired radio transmission path characteristic, the information related to the mode of data, and information related to a moving image compression rate that is needed when the wireless communication is performed;
notifying the source device of the revised table;
executing wireless communication from the source device to the sink device in a range of a transmission parameter value represented by the notified table; and
deriving the information related to the moving image compression rate on the basis of the information related to the radio transmission path characteristic.

3. A wireless device according to claim 1, wherein the mode is specified on the basis of whether a low delay or a high resolution is prioritized.

4. A communication method according to claim 2, wherein the mode is specified on the basis of whether a low delay of a high resolution is prioritized.

* * * * *